Oct. 30, 1962   E. SCHWERTL   3,061,072
DOUGHNUT ALIGNING DEVICE
Filed Aug. 15, 1960   2 Sheets-Sheet 1

INVENTOR
EDWARD SCHWERTL
BY
ATTORNEY

Oct. 30, 1962  E. SCHWERTL  3,061,072
DOUGHNUT ALIGNING DEVICE
Filed Aug. 15, 1960  2 Sheets-Sheet 2

INVENTOR
EDWARD SCHWERTL
BY Richard J. Dowling
ATTORNEY

3,061,072
DOUGHNUT ALIGNING DEVICE
Edward Schwertl, New Hyde Park, N.Y., assignor to Joe Lowe Corporation, New York, N.Y., a corporation of Delaware
Filed Aug. 15, 1960, Ser. No. 49,677
3 Claims. (Cl. 198—34)

The present invention relates generally to doughnut machines, and it has particular relation to a device for aligning a plurality of doughnuts in transverse rows and then transferring them in said aligned position between spaced flights of a flight conveyor moving longitudinally through a cooking vessel.

Heretofore, in the manufacture of doughnuts the raw dough forms were deposited in the hot cooking oil at one end of a cooking vessel from doughnut cutters or formers mounted directly thereabove. With the advent of yeast-raised doughnuts on large commercial scales, it was not possible to mount the cutters over the receiving end of the cooking tank and directly above the hot frying oil since such raw dough forms required proofing after forming and before frying. To discharge continuous quantities in a cooking vessel at spaced intervals without some sort of an aligning device, there was a tendency quite frequently for dough forms to over-ride a previous delivery with the result that the cooked forms would sometimes be stuck together.

There have been developed large and continuous automatic machines for forming, proofing and cooking yeast raised dough forms. Some difficulties have been encountered in these automatic machines with keeping the proofed dough forms moving from the time they are discharged into the receiving end of the frying tank from a delivery chute or conveyor so that the next group are not deposited thereon, whereupon they would be fried together and spoiled from a commercial sales standpoint.

The present invention has been developed with the idea in mind of overcoming these inherent difficulties, and provides a simple, efficient and inexpensive attachment for a cooking vessel that would align a plurality of dough forms in the hot cooking oil and deliver them in such alignment for movement by a conveyor having spaced flights without turning them over since their bottom sides had not been cooked completely.

An object of the present invention is to provide a simple, efficient, durable and inexpensive device which will align a plurality of raw dough forms floating in hot cooking oil and then deliver them in such alignment to spaced flights of a moving flight conveyor.

A further object of the invention is the provision of an aligning device consisting of a plurality of wire loop formations which when rotated will deliver a plurality of dough forms in a single transverse row without turning them over while at the same time holding back any succeeding group of dough forms and form them in a single transverse row for subsequent delivery to a flight conveyor.

Another object of the invention is to provide a doughnut aligning device which may be mounted within the cooking oil of a conventional cooking vessel without noticeably impeding the circulation or flow of the cooking oil therethrough.

Other and further objects and advantages of the invention reside in the detailed construction of the machine, which result in simplicity, economy and efficiency, and which will be apparent from the following description, wherein a preferred embodiment of the invention is shown, reference being had to the accompanying drawings, forming a part hereof, wherein like numerals indicate like parts, in which.

Figure 1:
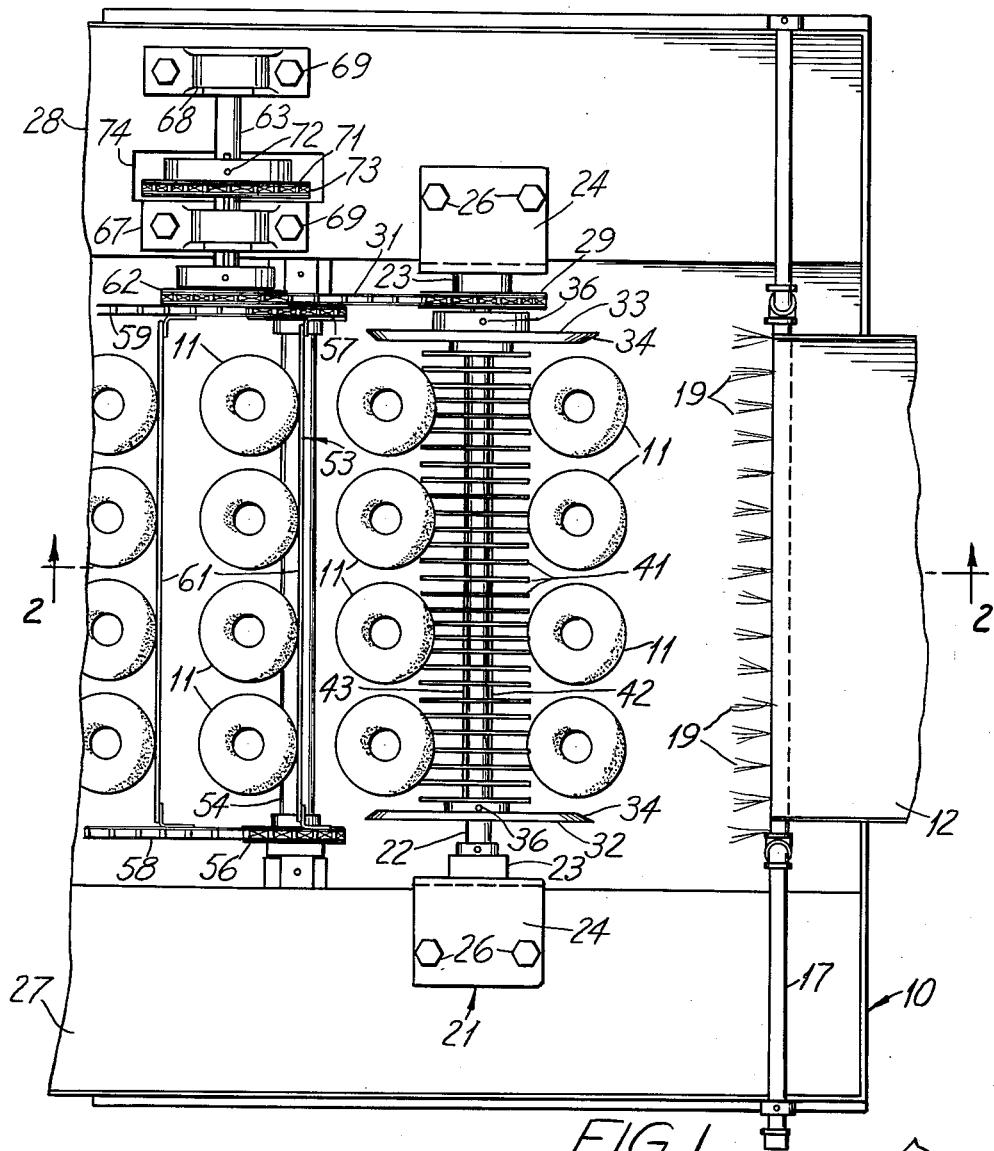
FIGURE 1 is a fragmentary plan view of the receiving end of a conventional cooking vessel equipped with an aligning device made in accordance with the principles of the invention.

Referring now to the drawings, and particularly to FIGURE 1 thereof, there is shown the receiving end of a conventional cooking vessel 10 of substantially rectangular shape into which continuous spaced rows of proofed dough forms 11 are discharged from a chute 12 into the hot frying oil 13 for cooking.

Mounted transversely of the receiving end of the cooking vessel 10 and slightly above the normal level 16 of the hot frying oil 13 is a pipe 17, which is connected at one end to an outside source of air supply (not shown). The pipe 17 has a series of longitudinally spaced holes along its inner side, as indicated at 18, through which small jets of air 19 may be discharged. These air jets 19 will serve to blow any dough forms 11 discharged from the chute 12 away therefrom and towards a dough form aligning device 21.

The dough form aligning device 21 comprises a shaft 22 mounted transversely of the vessel 10, which is suitably journalled in bearings 23 secured in blocks 24, which, in turn, are secured fixedly by spaced bolts 26 to the top side rails 27 and 28 of said vessel 10. One end of the shaft 22 has a sprocket wheel 29 keyed thereto for receiving a driving chain 31.

A pair of spaced wire rings 32 and 33, having inwardly beveled peripheral edges, as indicated at 34, are mounted adjacent each end of the shaft 22. It will be noted that the ring 33 is mounted inside of the sprocket wheel 29. The rings 32 and 33 are fixed to the shaft 22 by set screws 36.

Between the spaced rings 32 and 33 on the shaft 22, there is mounted a series of formed integrally looped wire formations 41 spaced longitudinally thereof. Each looped wire formation 41 is mounted centrally on the shaft 22 by an intermediate section of spaced parallel straight wires 42 and 43, which are in turn attached tangentially to the opposite sides thereof, as by spot-welding, soldering etc., said straight spaced wires 42 and 43 form the middle section of each loop formation 41. Each formation 41 has outwardly extending looped end sections 44 and 45 formed integrally with said wires 42 and 43 and joined at their outer periphery. The looped end 44 has one straight side 46, which extends substantially radially outwardly from said shaft 22, and one arcuate convex side 47 which connects with the outer end of said straight side 46 at its outer periphery. It will be noted that the straight side 46 of the looped end 44 is oppositely arranged from the straight side 46 of the looped end 45, and, of course, the arcuate convex sides 47 will also be reversed. The looped ends 44 and 45 of each of the spaced wire formations 41 and the straight ends are connected at the meeting points on their outer periphery by transverse rods 51 and 52, which, in turn, have their opposite ends secured in the rings 32 and 33. Each looped end 44 and 45 is spot-welded or otherwise secured fixedly to the rods 51 and 52, which not only serve to maintain the spacing arrangement but lend rigidity and support to the assembly.

Spaced forwardly of the aligning device 21, but in juxtaposition therewith is a conventional flight conveyor 53, having a shaft 54, spaced fixed sprocket wheels 56 and 57 over which are trained spaced chains 58 and 59. The chains 58 and 59 are connected transversely by longitudinally spaced flight bars 61, which serve to move the dough forms 11 in spaced timed sequence through the cooking vessel 10 in a well understood manner.

The aligning device 21 is driven by the chain 31, which has its opposite end connected to a sprocket wheel 62 secured to the inner end of a shaft 63, which is journalled in suitable bearing brackets 67 and 68 secured to the top side rail 28 by bolts 69. The shaft 63 has a second and larger sprocket wheel 71 secured thereto by a set screw 72, which, in turn, has a chain 73 passing downwardly through an opening 74 in the side rail 28. The opposite end of the chain 73 (not shown) engages a sprocket wheel which, in turn, is driven in timed sequence by the driving mechanism for the flight conveyor 53.

In describing the operation of the aligning device, it will be assumed that the conveyors are operating and the aligning device 21 is rotating in timed sequence therewith.

Figure 2:
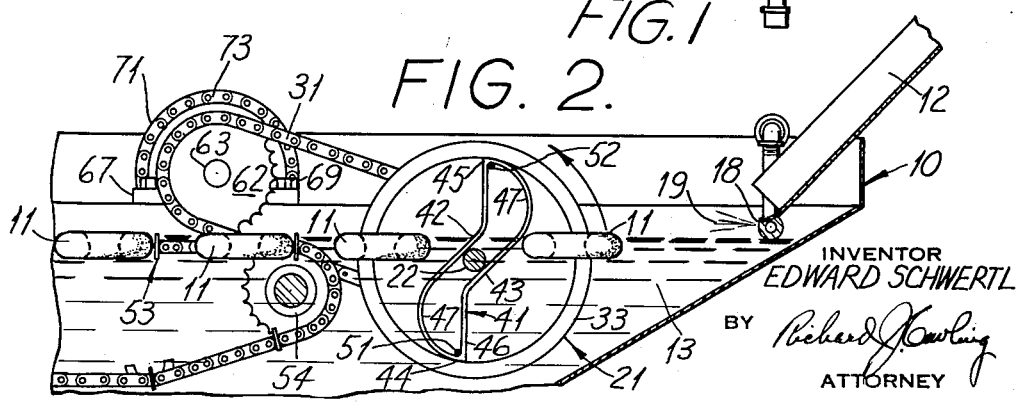
FIGURE 2 is a longitudinal sectional view taken substantially along the line 2—2 of FIGURE 1, looking in the direction of the arrows.
Figure 3:
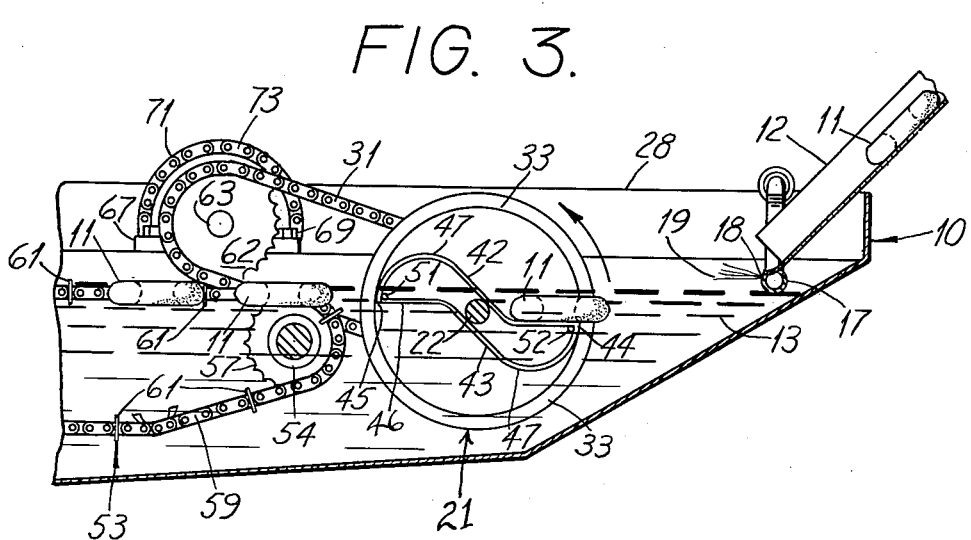
FIGURE 3 is a similar view to that shown in FIGURE 2, but showing the aligning device in substantially its receiving position at the time a row of dough forms is being received for transfer to a flight conveyor, which will in turn carry them through the cooking vessel in spaced rows.
Figure 4:
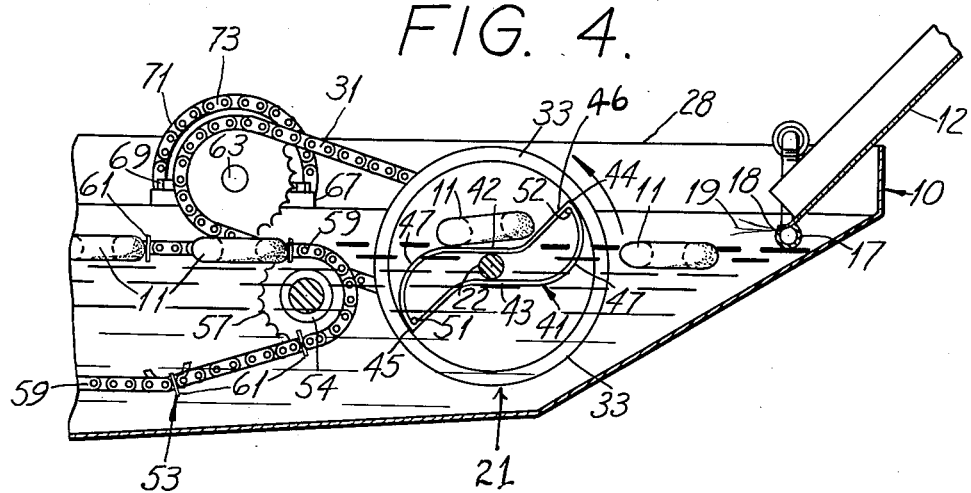
FIGURE 4 is another view similar to FIGURE 2, but showing the aligning device in substantially its discharge position at the time it is about to discharge its row of aligned dough forms into the path of the flight conveyor.

As the raw proofed dough forms 11 slide down the shute 12 and drop into the hot frying oil 13, they sink momentarily and then rise to the surface and float. The jets of air 19 thereupon tend to blow them forwardly of the tank and into the aligning device 21. If the aligning device 21 is in the position shown in FIGURES 1 and 2, the dough forms 11 will strike the arcuate side 47 of the looped formations 41 and be held up until the straight side 46 moves upwardly under said dough forms and lifts them out of the frying oil 13. The aligning device 21 turns so slowly that the dough forms 11 are lifted compeltely out of the frying oil 13, whereupon they tend to slide down the straight side 46, across the straight middle section on the wire 43 and back into the frying oil 13 on the opposite side of said aligning device 21. They are not turned over, but the same bottom side is deposited back into the frying oil for further frying. It will be obvious that the aligning device will present the dough forms 11 in a transverse row between adjacent flight bars 61, whereupon they will thereafter be carried forwardly through the cooking vessel 10 in such desired arrangement.

Although I have only shown and described in detail one form which the invention may assume, it will be apparent to those skilled in the art that the same is not to be so limited, but that various other modifications may be made therein without departing from the spirit thereof or from the scope of the appended claims.

What I claim is:
1. A rotary aligning device which comprises a shaft, a series of looped wire formations mounted on said shaft and spaced longitudinally thereof, each looped wire formation being formed integrally and having a straight intermediate section of spaced parallel wires attached tangentially to opposite sides of said shaft, outwardly extending looped end sections joined at the outer periphery, each end section having a straight side extending at an angle to the straight intermediate section and an arcuate side which extends convexly of said straight intermediate section, the straight side and the convex side of the opposite end sections of each looped formation being arranged oppositely, and means for rotating said shaft.

2. A rotary aligning device which comprises a shaft, a series of looped wire formations mounted on said shaft and spaced longitudinally thereof, each looped wire formation being formed integrally and having a straight intermediate section of spaced parallel wires attached tangentially to opposite sides of said shaft, outwardly extending looped end sections joined at the outer periphery, each end section having a straight side extending at an angle to the straight intermediate section and an arcuate side which extends convexly of said straight intermediate section, the straight side and the convex side of the opposite end sections of each looped formation being arranged oppositely, rods extending parallel to said shaft and connecting the looped end sections of the looped formations at their outer peripheries, and means for rotating said shaft.

3. A rotary aligning device which comprises a shaft, a series of looped wire formations mounted on said shaft and spaced longitudinally thereof, each looped wire formation being formed integrally and having a straight intermediate section of spaced parallel wires attached tangentially to opposite sides of said shaft, outwardly extending looped end sections joinned at the outer periphery, each end section having a straight side extending at an angle to the straight intermediate section and an arcuate side which extends convexly of said straight intermediate section, the straight side and the convex side of the opposite end sections of each looped formation being arranged oppositely, spaced enlarged guide rings mounted on said shaft flanking the ends of said transversely spaced looped wire formations, and means for rotating said shaft.

References Cited in the file of this patent
UNITED STATES PATENTS

| | | |
|---|---|---|
| 1,904,370 | Hunter | Apr. 18, 1933 |
| 1,927,786 | Hunter | Sept. 19, 1933 |
| 2,024,513 | Diescher | Dec. 17, 1935 |
| 2,186,566 | Albright | Jan. 9, 1940 |
| 2,918,098 | Keesling | Dec. 22, 1959 |